United States Patent [19]
Johnston

[11] Patent Number: 5,481,614
[45] Date of Patent: Jan. 2, 1996

[54] METHOD AND APPARATUS FOR CODING AUDIO SIGNALS BASED ON PERCEPTUAL MODEL

[75] Inventor: James D. Johnston, Warren, N.J.

[73] Assignee: AT&T Corp., Murray Hill, N.J.

[21] Appl. No.: 115,500

[22] Filed: Sep. 1, 1993

Related U.S. Application Data

[63] Continuation of Ser. No. 844,804, Mar. 2, 1992.

[51] Int. Cl.$^6$ ..................................................... H04H 5/00
[52] U.S. Cl. ................................................ 381/2; 381/30
[58] Field of Search ............................... 381/1, 2, 77, 30, 381/31

[56] References Cited

U.S. PATENT DOCUMENTS

| | | | |
|---|---|---|---|
| 5,040,217 | 8/1991 | Brandenburg | 381/47 |
| 5,285,498 | 2/1994 | Johnston | 381/2 |

FOREIGN PATENT DOCUMENTS

| | | | |
|---|---|---|---|
| 0446968 | 9/1984 | European Pat. Off. | H04N 7/13 |
| 0402149 | 6/1990 | European Pat. Off. | H03M 7/30 |
| WO88/01811 | 3/1988 | WIPO | H03M 7/00 |

OTHER PUBLICATIONS

Tan and Vermeulen, "Digital audio tape for data storage", *IEEE Spectrum*, Oct. 1989, pp. 34–38.
N. S. Jayant and P. Noll, "Digital Coding of Waveforms," Prentice–Hall, Inc. 1984, pp. 1–9.
E. F. Schroeder and J. J. Platte, "MSC': Stereo Audio Coding with DC–Quality and 256 kBIT/SEC," *IEEE Trans. on Consumer Electronics*, vol. CE–33, No. 4, Nov. 1987, pp. 512–519.
J. D. Johnston, "Transform Coding of Audio Signals Using Perceptual Noise Criteria", *IEEE Journal on Selected Areas in Communications*, vol. 6, No. 2, Feb. 1988, pp. 314–323.
B. C. J. Morre, "An Introduction to the Psychology of Hearing", Second Edition, expecially chapter 5, Academic Press, Orlando, Fla., 1982, pp. 150–184.
J. D. Johnston, "Estimation of Perceptual Entropy Using Noise Masking Criteria", ICASSP, 1988, pp. 2524–2527.
J. D. Johnston, "Perceptual Transform Coding of Wideband Stereo Signals", ICASSP, 1989, pp. 1993–1996.
J. P. Princen and A. B. Bradley, "Analysis/Synthesis Filter Bank Design Based on Time Domain Aliasing Cancellation," *IEEE Trans. ASSP*, vol. 34, No. 5, Oct., 1986, pp. 1153–1161.
K. Brandenburg and J. D. Johnston, "Second Generation Perceptual Audio Coding: The Hybrid Coder," AES 89th Convention, 1990, pp. 1–12.
J. Princen et al., "Sub–band Transform Coding Using Filter Bank Designs Based on Time Domain Aliasing Cancellation," *IEEE ICASSP*, pp. 2161–2164, 1987.

*Primary Examiner*—Forester W. Isen
*Attorney, Agent, or Firm*—William Ryan; David M. Rosenblatt

[57] ABSTRACT

Coding of high quality stereophonic audio signals is accomplished in a perceptual filterbank coder which exploits the interchannel redundancies and psychoacoustic. Using perceptual principles, switching between a normal and short window of input samples improve output signal quality for certain input signals, particularly those having a rapid attack. Switching is also accomplished between coding of left and right channels and so-called sum and difference channels in response to particular signal conditions. A number of new perceptually based techniques, including improved threshold determinations, result in high quality

7 Claims, 10 Drawing Sheets

FIELD SCALE FACTORS IN THE STREAM: [1, -1, 2, 1, 5, 3, -1, 50]

FIELD COEFFICIENTS IN THE STREAM: [W0-3, V0-3, U0-3, ...]

METHOD AND APPARATUS FOR CODING AUDIO SIGNALS BASED ON PERCEPTUAL MODEL

This is a continuation of application Ser. No. 07/844,804 filed Mar. 2, 1992.

CROSS-REFERENCE TO RELATED APPLICATIONS AND MATERIALS

The following U.S. patent applications filed concurrently with the present application and assigned to the assignee of the present application are related to the present application and each is hereby incorporated herein as if set forth in its entirety: "A METHOD AND APPARATUS FOR THE PERCEPTUAL CODING OF AUDIO SIGNALS," by A. Ferreira and J. D. Johnston; "AN ENTROPY CODER" by J. D. Johnston and J. Reeds; and "RATE LOOP PROCESSOR FOR PERCEPTUAL ENCODER/DECODER," by J. D. Johnston.

FIELD OF THE INVENTION

The present invention relates to processing of information signals, and more particularly, to the efficient encoding and decoding of monophonic and stereophonic audio signals, including signals representative of voice and music information, for storage or transmission.

BACKGROUND OF THE INVENTION

Consumer, industrial, studio and laboratory products for storing, processing and communicating high quality audio signals are in great demand. For example, so-called compact disc ("CD") and digital audio tape ("DAT") recordings for music have largely replaced the long-popular phonograph record and cassette tape. Likewise, recently available digital audio tape ("DAT") recordings promise to provide greater flexibility and high storage density for high quality audio signals. See, also, Tan and Vermeulen, "Digital audio tape for data storage", *IEEE Spectrum*, pp. 34–38 (Oct. 1989). A demand is also arising for broadcast applications of digital technology that offer CD-like quality.

While these emerging digital techniques are capable of producing high quality signals, such performance is often achieved only at the expense of considerable data storage capacity or transmission bandwidth. Accordingly, much work has been done in an attempt to compress high quality audio signals for storage and transmission.

Most of the prior work directed to compressing signals for transmission and storage has sought to reduce the redundancies that the source of the signals places on the signal. Thus, such techniques as ADPCM, sub-band coding and transform coding described, e.g., in N. S. Jayant and P. Noll, "Digital Coding of Waveforms," Prentice-Hall, Inc. 1984, have sought to eliminate redundancies that otherwise would exist in the source signals.

In other approaches, the irrelevant information in source signals is sought to be eliminated using techniques based on models of the human perceptual system. Such techniques are described, e.g., in E. F. Schroeder and J. J. Platte, "'MSC': Stereo Audio Coding with CD-Quality and 256 kBIT/SEC," IEEE Trans. on Consumer Electronics, Vol. CE-33, No. 4, November 1987; and Johnston, *Transform Coding of Audio Signals Using Noise Criteria*, Vol. 6, No. 2, IEEE J.S.C.A. (February 1988).

Perceptual coding, as described, e.g., in the Johnston paper relates to a technique for lowering required bitrates (or reapportioning available bits) or total number of bits in representing audio signals. In this form of coding, a masking threshold for unwanted signals is identified as a function of frequency of the desired signal. Then, inter alia, the coarseness of quantizing used to represent a signal component of the desired signal is selected such that the quantizing noise introduced by the coding does not rise above the noise threshold, though it may be quite near this threshold. The introduced noise is therefore masked in the perception process. While traditional signal-to-noise ratios for such perceptually coded signals may be relatively low, the quality of these signals upon decoding, as perceived by a human listener, is nevertheless high.

Brandenburg et al, U.S. Pat. No. 5,040,217, issued Aug. 13, 1991, describes a system for efficiently coding and decoding high quality audio signals using such perceptual considerations. In particular, using a measure of the "noise-like" or "tone-like" quality of the input signals, the embodiments described in the latter system provides a very efficient coding for monophonic audio signals.

It is, of course, important that the coding techniques used to compress audio signals do not themselves introduce offensive components or artifacts. This is especially important when coding stereophonic audio information where coded information corresponding to one stereo channel, when decoded for reproduction, can interfere or interact with coding information corresponding to the other stereo channel. Implementation choices for coding two stereo channels include so-called "dual mono" coders using two independent coders operating at fixed bit rates. By contrast, "joint mono" coders use two monophonic coders but share one combined bit rate, i.e., the bit rate for the two coders is constrained to be less than or equal to a fixed rate, but trade-offs can be made between the bit rates for individual coders. "Joint stereo" coders are those that attempt to use interchannel properties for the stereo pair for realizing additional coding gain.

It has been found that the independent coding of the two channels of a stereo pair, especially at low bit-rates, can lead to a number of undesirable psychoacoustic artifacts. Among them are those related to the localization of coding noise that does not match the localization of the dynamically imaged signal. Thus the human stereophonic perception process appears to add constraints to the encoding process if such mismatched localization is to be avoided. This finding is consistent with reports on binaural masking-level differences that appear to exist, at least for low frequencies, such that noise may be isolated spatially. Such binaural masking-level differences are considered to unmask a noise component that would be masked in a monophonic system. See, for example, B. C. J. Morre, "An Introduction to the Psychology of Hearing, Second Edition," especially chapter 5, Academic Press, Orlando, Fla., 1982.

One technique for reducing psychoacoustic artifacts in the stereophonic context employs the ISO-WG11-MPEG-Audio Psychoacoustic II [ISO] Model. In this model, a second limit of signal-to-noise ratio ("SNR") is applied to signal-to-noise ratios inside the psychoacoustic model. However, such additional SNR constraints typically require the expenditure of additional channel capacity or (in storage applications) the use of additional storage capacity, at low frequencies, while also degrading the monophonic performance of the coding.

SUMMARY OF THE INVENTION

Limitations of the prior art are overcome and a technical advance is made in a method and apparatus for coding a stereo pair of high quality audio channels in accordance with aspects of the present invention. Interchannel redundancy and irrelevancy are exploited to achieve lower bit-rates while maintaining high quality reproduction after decoding. While particularly appropriate to stereophonic coding and decoding, the advantages of the present invention may also be realized in conventional dual monophonic stereo coders.

An illustrative embodiment of the present invention employs a filter bank architecture using a Modified Discrete Cosine Transform (MDCT). In order to code the full range of signals that may be presented to the system, the illustrative embodiment advantageously uses both L/R (Left and Right) and M/S (Sum/Difference) coding, switched in both frequency and time in a signal dependent fashion. A new stereophonic noise masking model advantageously detects and avoids binaural artifacts in the coded stereophonic signal. Interchannel redundancy is exploited to provide enhanced compression for without degrading audio quality.

The time behavior of both Right and Left audio channels is advantageously accurately monitored and the results used to control the temporal resolution of the coding process. Thus, in one aspect, an illustrative embodiment of the present invention, provides processing of input signals in terms of either a normal MDCT window, or, when signal conditions indicate, shorter windows. Further, dynamic switching between RIGHT/LEFT or SUM/DIFFERENCE coding modes is provided both in time and frequency to control unwanted binaural noise localization, to prevent the need for overcoding of SUM/DIFFERENCE signals, and to maximize the global coding gain.

A typical bitstream definition and rate control loop are described which provide useful flexibility in forming the coder output. Interchannel irrelevancies, are advantageously eliminated and stereophonic noise masking improved, thereby to achieve improved reproduced audio quality in jointly coded stereophonic pairs. The rate control method used in an illustrative embodiment uses an interpolation between absolute thresholds and masking threshold for signals below the rate-limit of the coder, and a threshold elevation strategy under rate-limited conditions.

In accordance with an overall coder/decoder system aspect of the present invention, it proves advantageously to employ an improved Huffman-like entropy coder/decoder to further reduce the channel bit rate requirements, or storage capacity for storage applications. The noiseless compression method illustratively used employs Huffman coding along with a frequency-partitioning scheme to efficiently code the frequency samples for L, R, M and S, as may be dictated by the perceptual threshold.

The present invention provides a mechanism for determining the scale factors to be used in quantizing the audio signal (i.e., the MDCT coefficients output from the analysis filter bank) by using an approach different from the prior art, and while avoiding many of the restrictions and costs of prior quantizer/rate-loops. The audio signals quantized pursuant to the present invention introduce less noise and encode into fewer bits than the prior art.

These results are obtained in an illustrative embodiment of the present invention whereby the utilized scale factor, is iteratively derived by interpolating between a scale factor derived from a calculated threshold of hearing at the frequency corresponding to the frequency of the respective spectral coefficient to be quantized and a scale factor derived from the absolute threshold of hearing at said frequency until the quantized spectral coefficients can be encoded within permissible limits.

DETAILED DESCRIPTION

1. Overview

To simplify the present disclosure, the following patents, patent applications and publications are hereby incorporated by reference in the present disclosure as if fully set forth herein: U.S. Pat. No. 5,040,217, issued Aug. 13, 1991 by K. Brandenburg et al, U.S. patent application Ser. No. 07/292, 598, entitled *Perceptual Coding of Audio Signals,* filed Dec. 30, 1988; J. D. Johnston, *Transform Coding of Audio Signals Using Perceptual Noise Criteria,* IEEE Journal on Selected Areas in Communications, Vol. 6, No. 2 (February 1988); International Patent Application (PCT) WO 88/01811, filed Mar. 10, 1988; U.S. patent application Ser. No. 07/491,373, entitled *Hybrid Perceptual Coding,* filed Mar. 9, 1990, Brandenburg et al, *Aspec: Adaptive Spectral Entropy Coding of High Quality Music Signals,* AES 90th Convention (1991); Johnston, J., *Estimation of Perceptual Entropy Using Noise Masking Criteria,* ICASSP, (1988); J. D. Johnston, *Perceptual Transform Coding of Wideband Stereo Signals,* ICASSP (1989); E. F. Schroeder and J. J. Platte, "'MSC': Stereo Audio Coding with CD-Quality and 256 kBIT/SEC," IEEE Trans. on Consumer Electronics, Vol. CE-33, No. 4, November 1987; and Johnston, *Transform Coding of Audio Signals Using Noise Criteria,* Vol. 6, No. 2, IEEE J.S.C.A. (February 1988).

For clarity of explanation, the illustrative embodiment of the present invention is presented as comprising individual functional blocks (including functional blocks labeled as "processors"). The functions these blocks represent may be provided through the use of either shared or dedicated hardware, including, but not limited to, hardware capable of executing software. (Use of the term "processor" should not be construed to refer exclusively to hardware capable of executing software.) Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

Figure 1:
FIG. 1 presents an illustrative prior art audio communication/storage system of a type in which aspects of the present invention find application, and provides improvement and extension.

FIG. 1 is an overall block diagram of a system useful for incorporating an illustrative embodiment of the present invention. At the level shown, the system of FIG. 1 illustrates systems known in the prior art, but modifications, and extensions described herein will make clear the contributions of the present invention. In FIG. 1, an analog audio signal 101 is fed into a preprocessor 102 where it is sampled (typically at 48 KHz) and convened into a digital pulse code modulation ("PCM") signal 103 (typically 16 bits) in standard fashion. The PCM signal 103 is fed into a perceptual audio coder 104 ("PAC") which compresses the PCM signal and outputs the compressed PAC signal to a communications channel/storage medium 105. From the communications channel/storage medium the compressed PAC signal is fed into a perceptual audio decoder 107 which decompresses the compressed PAC signal and outputs a PCM signal 108 which is representative of the compressed PAC signal. From the perceptual audio decoder, the PCM signal 108 is fed into a post-processor 109 which mates an analog representation of the PCM signal 108.

Figure 2:
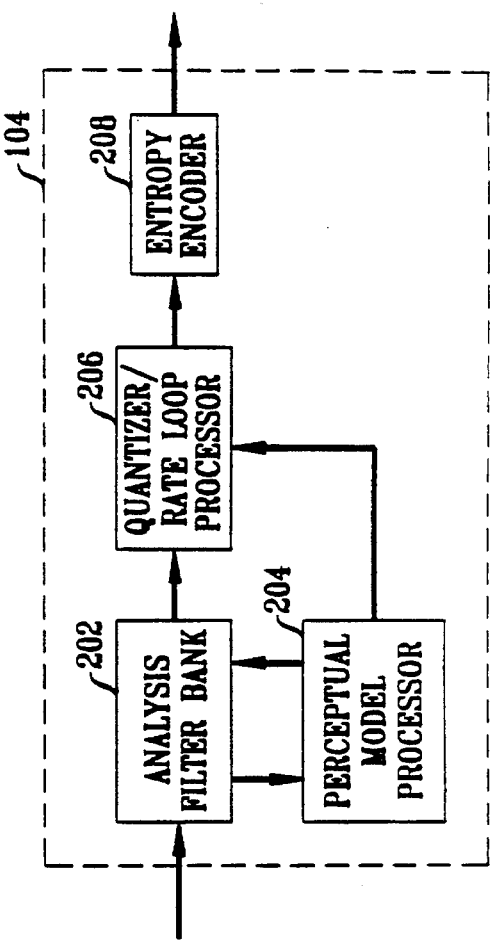
FIG. 2 presents an illustrative perceptual audio coder (PAC) in which the advances and teachings of the present invention find application, and provide improvement and extension.

An illustrative embodiment of the perceptual audio coder 104 is shown in block diagram form in FIG. 2. As in the case of the system illustrated in FIG. 1, the system of FIG. 2, without more, may equally describe certain prior art systems, e.g., the system disclosed in the Brandenburg, et al U.S. Pat. No. 5,040,217. However, with the extensions and modifications described herein, important new results are obtained. The perceptual audio coder of FIG. 2 may advantageously be viewed as comprising an analysis filter bank 202, a perceptual model processor 204, a quantizer/rate-loop processor 206 and an entropy coder 208.

The filter bank 202 in FIG. 2 advantageously transforms an input audio signal in time/frequency in such manner as to provide both some measure of signal processing gain (i.e. redundancy extraction) and a mapping of the filter bank inputs in a way that is meaningful in light of the human perceptual system. Advantageously, the well-known Modified Discrete Cosine Transform (MDCT) described, e.g., in J. P. Princen and A. B. Bradley, "Analysis/Synthesis Filter Bank Design Based on Time Domain Aliasing Cancellation," IEEE Trans. ASSP, Vol. 34, No. 5, October, 1986, may be adapted to perform such transforming of the input signals.

Features of the MDCT that make it useful in the present context include its critical sampling characteristic, i.e. for every n samples into the filter bank, n samples are obtained from the filter bank. Additionally, the MDCT typically provides half-overlap, i.e. the transform length is exactly twice the length of the number of samples, n, shifted into the filterbank. The half-overlap provides a good method of dealing with the control of noise injected independently into each filter tap as well as providing a good analysis window frequency response. In addition, in the absence of quantization, the MDCT provides exact reconstruction of the input samples, subject only to a delay of an integral number of samples.

One aspect in which the MDCT is advantageously modified for use in connection with a highly efficient stereophonic audio coder is the provision of the ability to switch the length of the analysis window for signal sections which have strongly non-stationary components in such a fashion that it retains the critically sampled and exact reconstruction properties. The incorporated U.S. patent application by Ferreira and Johnston, entitled "A METHOD AND APPARATUS FOR THE PERCEPTUAL CODING OF AUDIO SIGNALS," (referred to hereinafter as the "filter bank application") filed of even date with this application, describes a filter bank appropriate for performing the functions of element 202 in FIG. 2.

The perceptual model processor 204 shown in FIG. 2 calculates an estimate of the perceptual importance, noise masking properties, or just noticeable noise floor of the various signal components in the analysis bank. Signals representative of these quantities are then provided to other system elements to provide improved control of the filtering operations and organizing of the data to be sent to the channel or storage medium. Rather than using the critical band by critical band analysis described in J. D. Johnston, "Transform Coding of Audio Signals Using Perceptual Noise Criteria," IEEE J. on Selected Areas in Communications, February 1988, an illustrative embodiment of the present invention advantageously uses finer frequency resolution in the calculation of thresholds. Thus instead of using an overall tonality metric as in the last-cited Johnston paper, a tonality method based on that mentioned in K. Brandenburg and J. D. Johnston, "Second Generation Perceptual Audio Coding: The Hybrid Coder," AES 89th Convention, 1990 provides a tonality estimate that varies over frequency, thus providing a better fit for complex signals.

The psychoacoustic analysis performed in the perceptual model processor 204 provides a noise threshold for the L (Left), R (Right), M (Sum) and S (Difference) channels, as may be appropriate, for both the normal MDCT window and the shorter windows. Use of the shorter windows is advantageously controlled entirely by the psychoacoustic model processor.

In operation, an illustrative embodiment of the perceptual model processor 204 evaluates thresholds for the left and fight channels, denoted $THR_l$ and $THR_r$. The two thresholds are then compared in each of the illustrative 35 coder frequency partitions (56 partitions in the case of an active window-switched block). In each partition where the two thresholds vary between left and fight by less than some amount, typically 2 dB, the coder is switched into M/S mode. That is, the left signal for that band of frequencies is replaced by M=(L+R)/2, and the right signal is replaced by S=(L-R)/2. The actual amount of difference that triggers the last-mentioned substitution will vary with bitrate constraints and other system parameters.

The same threshold calculation used for L and R thresholds is also used for M and S thresholds, with the threshold calculated on the actual M and S signals. First, the basic thresholds, denoted $BTHR_m$ and $MLD_s$ are calculated. Then, the following steps are used to calculate the stereo masking contribution of the M and S signals.

1. An additional factor is calculated for each of the M and S thresholds. This factor, called $MLD_m$, and $MLD_s$, is calculated by multiplying the spread signal energy, (as derived, e.g., in J. D. Johnston, "Transform Coding of Audio Signals Using Perceptual Noise Criteria," IEEE J. on Selected Areas in Communications, February 1988; K.

Figure 3:
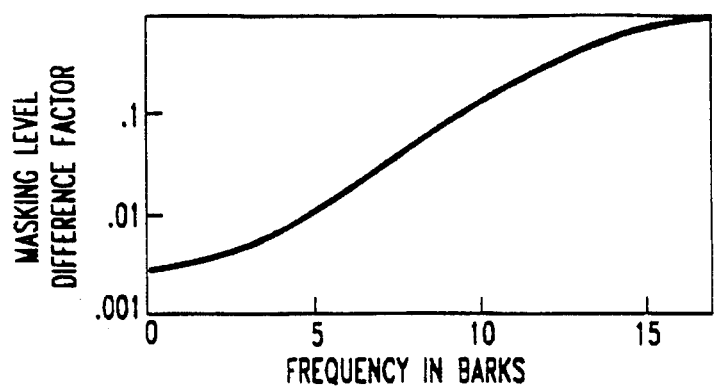
FIG. 3 shows a representation of a useful masking level difference factor used in threshold calculations.
Figure 8:
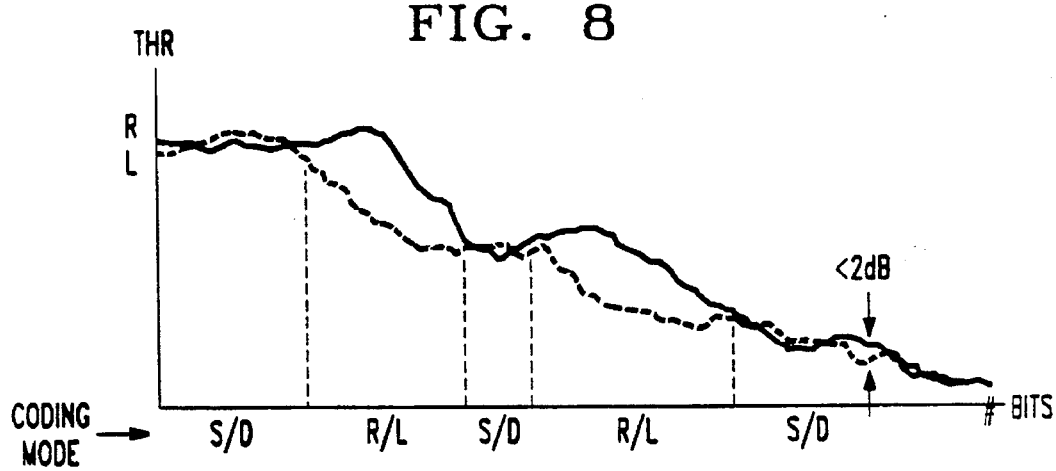
FIG. 8 illustrates certain threshold variations.
Figure 10:
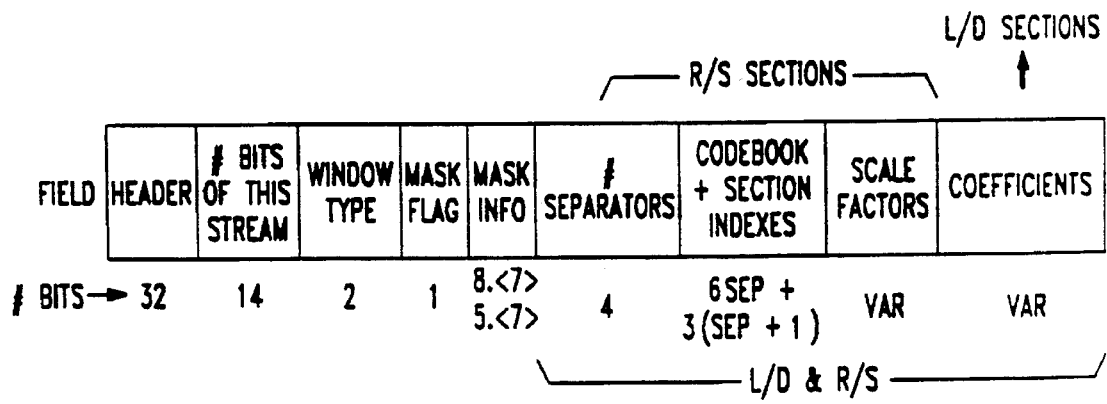
FIG. 10 shows bitstream organization.

Brandenburg and J. D. Johnston, "Second Generation Perceptual Audio Coding: The Hybrid Coder," AES 89th Convention, 1990; and Brandenburg, et al U.S. Pat. No. 5,040,217) by a masking level difference factor shown illustratively in FIG. 3. This calculates a second level of detectability of noise across frequency in the M and S channels, based on the masking level differences shown in various sources.

2. The actual threshold for M ($THR_m$) is calculated as $THR_m = \max(BTHR_m, \min(BTHR_s, MLD_s))$ and the threshold m= $\max(BTHR_m, \min(BTHR_s, MLD_s))$ and the threshold for S is calculated as $THR_s = \max(BTHR_s, \min(BTHR_m, MLD_m))$.

In effect, the MLD signal substitutes for the BTHR signal in cases where there is a chance of stereo unmasking. It is not necessary to consider the issue of M and S threshold depression due to unequal L and R thresholds, because of the fact that L and R thresholds are known to be equal.

The quantizer and rate control processor 206 used in the illustrative coder of FIG. 2 takes the outputs from the analysis bank and the perceptual model, and allocates bits, noise, and controls other system parameters so as to meet the required bit rate for the given application. In some example coders this may consist of nothing more than quantization so that the just noticeable difference of the perceptual model is never exceeded, with no (explicit) attention to bit rate; in some coders this may be a complex set of iteration loops that adjusts distortion and bitrate in order to achieve a balance between bit rate and coding noise. A particularly useful quantizer and rate control processor is described in incorporated U.S. patent application by J. D. Johnston, entitled "RATE LOOP PROCESSOR FOR PERCEPTUAL ENCODER/DECODER," (hereinafter referred to as the "rate loop application") filed of even date with the present application. Also desirably performed by the rate loop processor 206, and described in the rate loop application, is the function of receiving information from the quantized analyzed signal and any requisite side information, inserting synchronization and framing information. Again, these same functions are broadly described in the incorporated Brandenburg, et al, U.S. Pat. No. 5,040,217.

Entropy coder 208 is used to achieve a further noiseless compression in cooperation with the rate control processor 206. In particular, entropy coder 208, in accordance with another aspect of the present invention, advantageously receives inputs including a quantized audio signal output from quantizer/rate-loop 206, performs a lossless encoding on the quantized audio signal, and outputs a compressed audio signal to the communications channel/storage medium 106.

Illustrative entropy coder 208 advantageously comprises a novel variation of the minimum-redundancy Huffman coding technique to encode each quantized audio signal. The Huffman codes are described, e.g., in D. A. Huffman, "A Method for the Construction of Minimum Redundancy Codes", *Proc. IRE*, 40:1098–1101 (1952) and T. M. Cover and J. A. Thomas, .us Elements of Information Theory, pp. 92–101 (1991). The useful adaptations of the Huffman codes advantageously used in the context of the coder of FIG. 2 are described in more detail in the incorporated U.S. patent application by J. D. Johnston and J. Reeds (hereinafter the "entropy coder application") filed of even date with the present application and assigned to the assignee of this application. Those skilled in the data communications arts will readily perceive how to implement alternative embodiments of entropy coder 208 using other noiseless data compression techniques, including the well-known Lempel-Ziv compression methods.

The use of each of the elements shown in FIG. 2 will be described in greater detail in the context of the overall system functionality; details of operation will be provided for the perceptual model processor 204.

2.1. The Analysis Filter Bank

The analysis filter bank 202 of the perceptual audio coder 104 receives as input pulse code modulated ("PCM") digital audio signals (typically 16-bit signals sampled at 48 KHz), and outputs a representation of the input signal which identifies the individual frequency components of the input signal. Specifically, an output of the analysis filter bank 202 comprises a Modified Discrete Cosine Transform ("MDCT") of the input signal. See, J. Princen et al, "Subband Transform Coding Using Filter Bank Designs Based on Time Domain Aliasing Cancellation," IEEE ICASSP, pp. 2161–2164 (1987).

Figure 4:
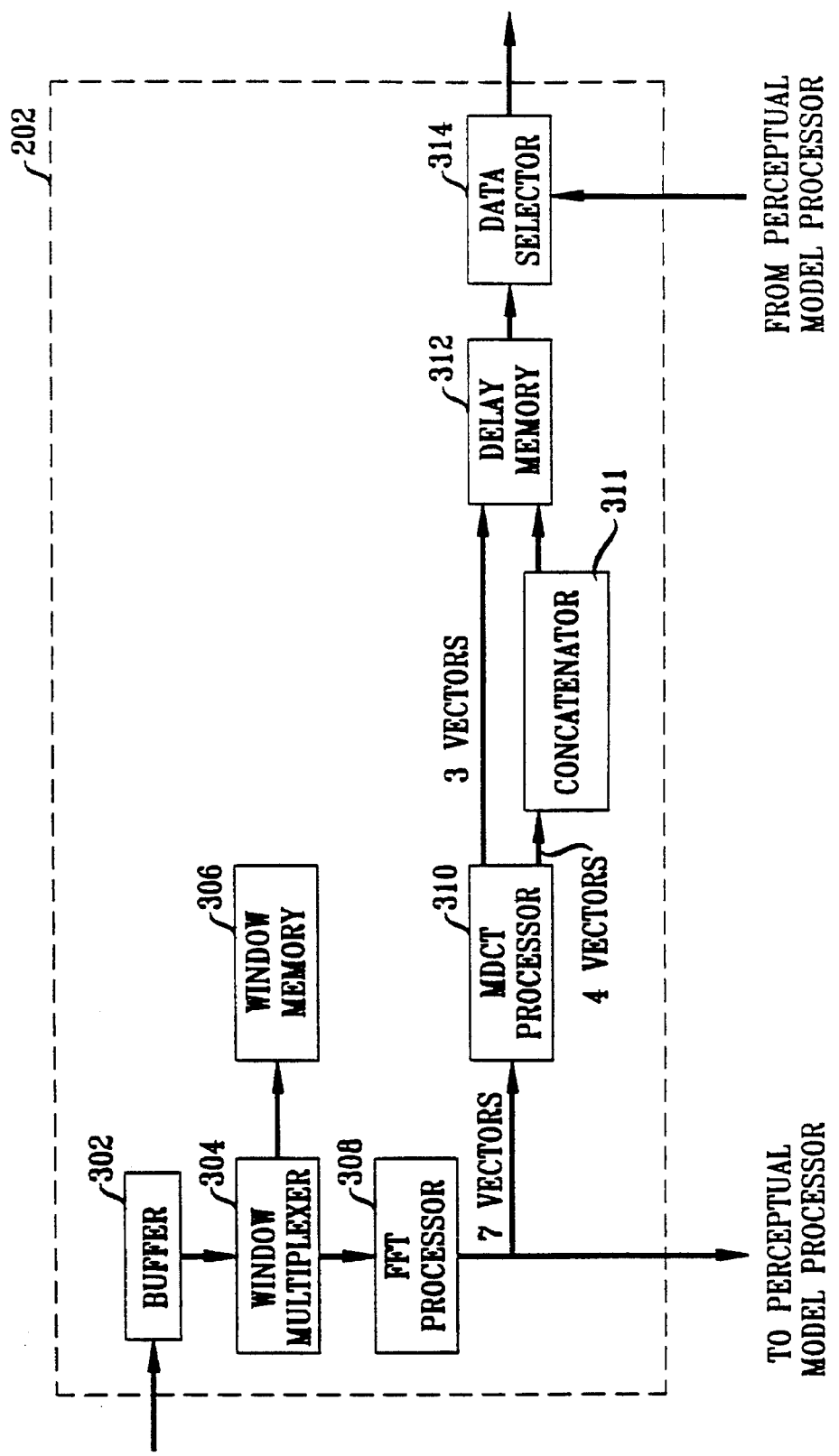
FIG. 4 presents an illustrative analysis filter bank according to an aspect of the present invention.

An illustrative analysis filter bank 202 according to one aspect of the present invention is presented in FIG. 4. Analysis filter bank 202 comprises an input signal buffer 302, a window multiplier 304, a window memory 306, an FFT processor 308, an MDCT processor 310, a concatenator 311, a delay memory 312 and a dam selector 132.

The analysis filter bank 202 operates on frames. A frame is conveniently chosen as the 2N PCM input audio signal samples held by input signal buffer 302. As stated above, each PCM input audio signal sample is represented by M bits. Illustratively, N=512 and M=16.

Input signal buffer 302 comprises two sections: a first section comprising N samples in buffer locations 1 to N, and a second section comprising N samples in buffer locations N+1 to 2N. Each frame to be coded by the perceptual audio coder 104 is defined by shifting N consecutive samples of the input audio signal into the input signal buffer 302. Older samples are located at higher buffer locations than newer samples.

Assuming that, at a given time, the input signal buffer 302 contains a frame of 2N audio signal samples, the succeeding frame is obtained by (1) shifting the N audio signal samples in buffer locations 1 to N into buffer locations N+1 to 2N, respectively, (the previous audio signal samples in locations N+1 to 2N may be either overwritten or deleted), and (2) by shifting into the input signal buffer 302, at buffer locations 1 to N, N new audio signal samples from preprocessor 102. Therefore, it can be seen that consecutive frames contain N samples in common: the first of the consecutive frames having the common samples in buffer locations 1 to N, and the second of the consecutive frames having the common samples in buffer locations N+1 to 2N. Analysis filter bank 202 is a critically sampled system (i.e., for every N audio signal samples received by the input signal buffer 302, the analysis filter bank 202 outputs a vector of N scalers to the quantizer/rate-loop 206).

Each frame of the input audio signal is provided to the window multiplier 304 by the input signal buffer 302 so that the window multiplier 304 may apply seven distinct data windows to the frame. Each data window is a vector of scalers called "coefficients". While all seven of the data windows have 2N coefficients (i.e., the same number as there are audio signal samples in the frame), four of the seven only have N/2 non-zero coefficients (i.e., one-fourth the number of audio signal samples in the frame). As is discussed below, the data window coefficients may be advantageously chosen to reduce the perceptual entropy of the output of the MDCT processor 310.

The information for the data window coefficients is stored in the window memory 306. The window memory 306 may illustratively comprise a random access memory ("RAM"), read only memory ("ROM"), or other magnetic or optical media. Drawings of seven illustrative data windows, as applied by window multiplier 304, are presented in FIG. 4. Typical vectors of coefficients for each of the seven data windows presented in FIG. 4 are presented in Appendix A. As may be seen in both FIG. 4 and in Appendix A, some of the data window coefficients may be equal to zero.

Keeping in mind that the data window is a vector of 2N scalers and that the audio signal frame is also a vector of 2N scalers, the data window coefficients are applied to the audio signal frame scalers through point-to-point multiplication (i.e., the first audio signal frame scaler is multiplied by the first data window coefficient, the second audio signal frame scaler is multiplied by the second data window coefficient, etc.). Window multiplier 304 may therefore comprise seven microprocessors operating in parallel, each performing 2N multiplications in order to apply one of the seven data window to the audio signal frame held by the input signal buffer 302. The output of the window multiplier 304 is seven vectors of 2N scalers to be referred to as "windowed frame vectors".

The seven windowed frame vectors are provided by window multiplier 304 to FFT processor 308. The FFT processor 308 performs an odd-frequency FFT on each of the seven windowed frame vectors. The odd-frequency FFT is an Discrete Fourier Transform evaluated at frequencies:

$$\frac{kf_H}{2N}$$

where k=1, 3, 5, . . . ,2N, and $f_H$ equals one half the sampling rate. The illustrative FFT processor 308 may comprise seven conventional decimation-in-time FFT processors operating in parallel, each operating on a different windowed frame vector. An output of the FFT processor 308 is seven vectors of 2N complex elements, to be referred to collectively as "FFT vectors".

FFT processor 308 provides the seven FFT vectors to both the perceptual model processor 204 and the MDCT processor 310. The perceptual model processor 204 uses the FFT vectors to direct the operation of the data selector 314 and the quantizer/rate-loop processor 206. Details regarding the operation of data selector 314 and perceptual model processor 204 are presented below.

MDCT processor 310 performs an MDCT based on the real components of each of the seven FFT vectors received from FFT processor 308. .P MDCT processor 310 may comprise seven microprocessors operating in parallel. Each such microprocessor determines one of the seven "MDCT vectors" of N real scalars based on one of the seven respective FFT vectors. For each FFT vector, F(k), the resulting MDCT vector, X (k), is formed as follows:

$$X(k) = Re[F(k)]\cos\left[\frac{\pi(2k+1)(1+N)}{4N}\right] \quad 1 \leq k \leq N.$$

The procedure need run k only to N, not 2N, because of redundancy in the result. To wit, for N<K≦2N:

$$X(k)=-X(2N-k)$$

MDCT processor 310 provides the seven MDCT vectors to concatenator 311 and delay memory 312.

As discussed above with reference to window multiplier 304, four of the seven data windows have N/2 non-zero coefficients (see FIG. 4c–f). This means that four of the windowed frame vectors contain only N/2 non-zero values. Therefore, the non-zero values of these four vectors may be concatenated into a single vector of length 2N by concatenator 311 upon output from MDCT processor 310. The resulting concatenation of these vectors is handled as a single vector for subsequent purposes. Thus, delay memory 312 is presented with four MDCT vectors, rather than seven.

Delay memory 312 receives the four MDCT vectors from MDCT processor 314 and concatenator 311 for the purpose of providing temporary storage. Delay memory 312 provides a delay of one audio signal frame (as defined by input signal buffer 302) on the flow of the four MDCT vectors through the filter bank 202. The delay is provided by (i) storing the two most recent consecutive sets of MDCT vectors representing consecutive audio signal frames and (ii) presenting as input to data selector 314 the older of the consecutive sets of vectors. Delay memory 312 may comprise random access memory (RAM) of size:

$$M \times 2 \times 4 \times N$$

where 2 is the number of consecutive sets of vectors, 4 is the number of vectors in a set, N is the number of elements in an MDCT vector, and M is the number of bits used to represent an MDCT vector element.

Data selector 314 selects one of the four MDCT vectors provided by delay memory 312 to be output from the filter bank 202 to quantizer/rate-loop 206. As mentioned above, the perceptual model processor 204 directs the operation of data selector 314 based on the FFT vectors provided by the FFT processor 308. Due to the operation of delay memory 312, the seven FFT vectors provided to the perceptual model processor 204 and the four MDCT vectors concurrently provided to data selector 314 are not based on the same audio input frame, but rather on two consecutive input signal frames—the MDCT vectors based on the earlier of the frames, and the FFT vectors based on the later of the frames. Thus, the selection of a specific MDCT vector is based on information contained in the next successive audio signal frame. The criteria according to which the perceptual model processor 204 directs the selection of an MDCT vector is described in Section 2.2, below.

For purposes of an illustrative stereo embodiment, the above analysis filterbank 202 is provided for each of the left and right channels.

2.2. The Perceptual Model Processor

A perceptual coder achieves success in reducing the number of bits required to accurately represent high quality audio signals, in part, by introducing noise associated with quantization of information bearing signals, such as the MDCT information from the filter bank 202. The goal is, of course, to introduce this noise in an imperceptible or benign way. This noise shaping is primarily a frequency analysis instrument, so it is convenient to convert a signal into a spectral representation (e.g., the MDCT vectors provided by filter bank 202), compute the shape and amount of the noise that will be masked by these signals and injecting it by quantizing the spectral values. These and other basic operations are represented in the structure of the perceptual coder shown in FIG. 2.

The perceptual model processor 204 of the perceptual audio coder 104 illustratively receives its input from the analysis filter bank 202 which operates on successive frames. The perceptual model processor inputs then typically comprise seven Fast Fourier Transform (FFT) vectors from the analysis filter bank 202. These are the outputs of the FFT processor 308 in the form of seven vectors of 2N complex elements, each corresponding to one of the windowed frame vectors.

In order to mask the quantization noise by the signal, one must consider the spectral contents of the signal and the duration of a particular spectral pattern of the signal. These two aspects are related to masking in the frequency domain where signal and noise are approximately steady state—given the integration period of the hearing system—and also with masking in the time domain where signal and noise are subjected to different cochlear filters. The shape and length of these filters are frequency dependent.

Masking in the frequency domain is described by the concept of simultaneous masking. Masking in the time domain is characterized by the concept of premasking and postmasking. These concepts are extensively explained in the literature; see, for example, E. Zwicker and H. Fastl, "*Psychoacoustics, Facts, and Models,*" Springer-Verlag, 1990. To make these concepts useful to perceptual coding, they are embodied in different ways.

Simultaneous masking is evaluated by using perceptual noise shaping models. Given the spectral contents of the signal and its description in terms of noise-like or tone-like behavior, these models produce an hypothetical masking threshold that rules the quantization level of each spectral component. This noise shaping represents the maximum amount of noise that may be introduced in the original signal without causing any perceptible difference. A measure called the PERCEPTUAL ENTROPY (PE) uses this hypothetical masking threshold to estimate the theoretical lower bound of the bitrate for transparent encoding. J. D. Jonston, *Estimation of Perceptual Entropy Using Noise Masking Criteria,* ICASSP, 1989.

Premasking characterizes the (in)audibility of a noise that starts some time before the masker signal which is louder than the noise. The noise amplitude must be more attenuated as the delay increases. This attenuation level is also frequency dependent. If the noise is the quantization noise attenuated by the first half of the synthesis window, experimental evidence indicates the maximum acceptable delay to be about 1 millisecond.

This problem is very sensitive and can conflict directly with achieving a good coding gain. Assuming stationary conditions—which is a false premiss—The coding gain is bigger for larger transforms, but, the quantization error spreads till the beginning of the reconstructed time segment. So, if a transform length of 1024 points is used, with a digital signal sampled at a rate of 48000 Hz, the noise will appear at most 21 milliseconds before the signal. This scenario is particularly critical when the signal takes the form of a sharp transient in the time domain commonly known as an "attack". In this case the quantization noise is audible before the attack. The effect is known as pre-echo.

Thus, a fixed length filter bank is a not a good perceptual solution nor a signal processing solution for non-stationary regions of the signal. It will be shown later that a possible way to circumvent this problem is to improve the temporal resolution of the coder by reducing the analysis/synthesis window length. This is implemented as a window switching mechanism when conditions of attack are detected. In this way, the coding gain achieved by using a long analysis/synthesis window will be affected only when such detection occurs with a consequent need to switch to a shorter analysis/synthesis window.

Postmasking characterizes the (in)audibility of a noise when it remains after the cessation of a stronger masker signal. In this case the acceptable delays are in the order of 20 milliseconds. Given that the bigger transformed time segment lasts 21 milliseconds (1024 samples), no special care is needed to handle this situation.

WINDOW SWITCHING

The PERCEPTUAL ENTROPY (PE) measure of a particular transform segment gives the theoretical lower bound of bits/sample to code that segment transparently. Due to its memory properties, which are related to premasking protection, this measure shows a significant increase of the PE value to its previous value—related with the previous segment—when some situations of strong non-stationarity of the signal (e.g. an attack) are presented. This important property is used to activate the window switching mechanism in order to reduce pre-echo. This window switching mechanism is not a new strategy, having been used, e.g., in the ASPEC coder, described in the ISO/MPEG Audio Coding Report, 1990, but the decision technique behind it is new using the PE information to accurately localize the non-stationafity and define the right moment to operate the switch.

Two basic window lengths: 1024 samples and 256 samples are used. The former corresponds to a segment duration of about 21 milliseconds and the latter to a segment duration of about 5 milliseconds. Short windows are associated in sets of 4 to represent as much spectral data as a large window (but they represent a "different" number of temporal samples). In order to make the transition from large to short windows and vice-versa it proves convenient to use two more types of windows. A START window makes the transition from large (regular) to short windows and a STOP window makes the opposite transition, as shown in FIG. 5b. See the above-cited Princen reference for useful information on this subject. Both windows are 1024 samples wide. They are useful to keep the system critically sampled and also to guarantee the time aliasing cancellation process in the transition region.

In order to exploit interchannel redundancy and irrelevancy, the same type of window is used for RIGHT and LEFT channels in each segment.

The stationarity behavior of the signal is monitored at two levels. First by large regular windows, then if necessary, by short windows. Accordingly, the PE of large (regular) window is calculated for every segment while the PE of short windows are calculated only when needed. However, the tonality information for both types is updated for every segment in order to follow the continuous variation of the signal.

Unless stated otherwise, a segment involves 1024 samples which is the length of a large regular window.

Figure 5A:
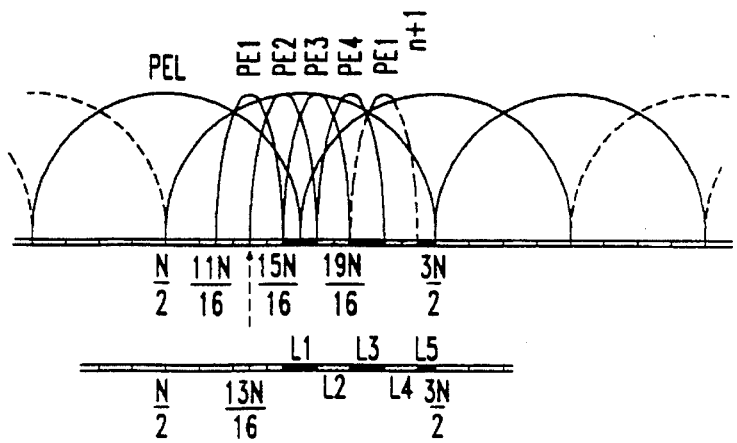
FIG. 5(a) through 5(e) illustrate the operation of various window functions.
Figure 5B:
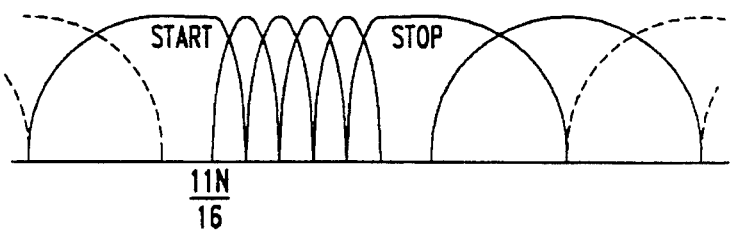
Figure 5C:
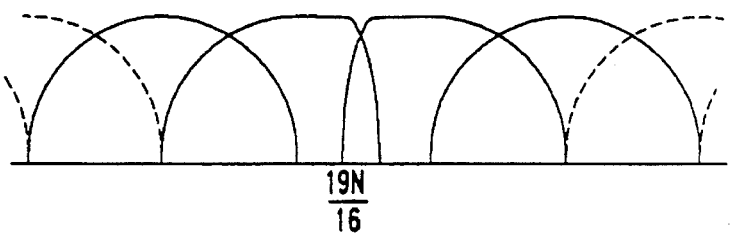
Figure 5D:
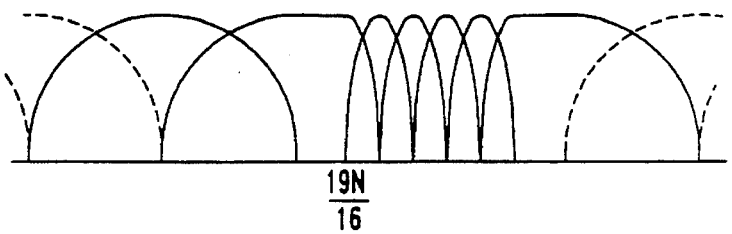

The diagram of FIG. 5a represents all the monitoring possibilities when the segment from the point N/2 till the point $$\frac{3N}{2}$$

is being analysed. Related to diagram is the flowchart of FIG. 6 describes the monitoring sequence and decision technique. We need to keep in buffer three halves of a segment in order to be able to insert a START window prior to a sequence of short windows when necessary. FIGS. 5a–e explicitly considers the 50% overlap between successive segments.

The process begins by analysing a "new" segment with 512 new temporal samples (the remaining 512 samples belong to the previous segment). The PE of this new segment and the differential PE to the previous segment are calculated. If the latter value reaches a predefined threshold, then the existence of a non-stationarity inside the current segment is declared and details are obtained by processing four short windows with positions as represented in FIG. 5a. The PE value of each short window is calculated resulting in the ordered sequence: PE1, PE2, PE3 and PE4. From these values, the exact beginning of the strong non-stationarity of the signal is deduced. Only five locations are possible. They are identified in FIG. 4a as L1, L2, L3, L4 and L5. As it will become evident, if the non-stationarity had occurred somewhere from the point N/2 till the point $$\frac{15N}{16},$$

that situation would have been detected in the previous segment. It follows that the PE1 value does not contain relevant information about the stationarity of the current segment. The average PE of the short windows is compared with the PE of the large window of the same segment. A smaller PE reveals reveals a more efficient coding situation. Thus if the former value is not smaller than the latter, then we assume that we are facing a degenerate situation and the window switching process is aborted.

Figure 5E:
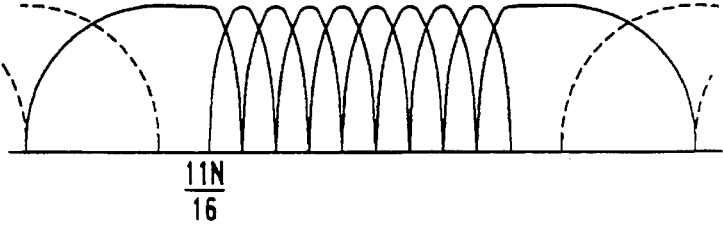
Figure 6:
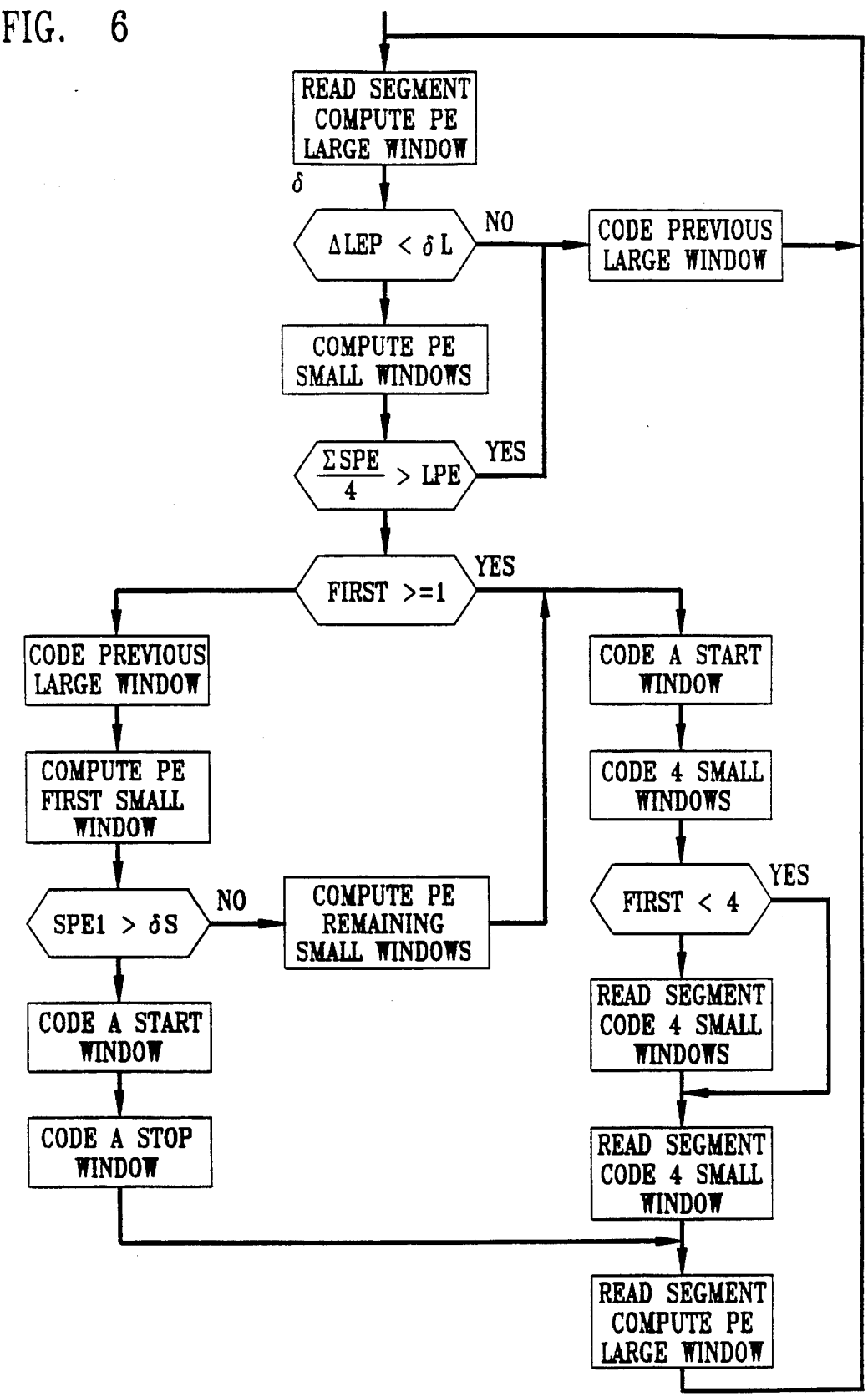
FIG. 6 is a flow chart illustrating window switching functionality.
Figure 7:
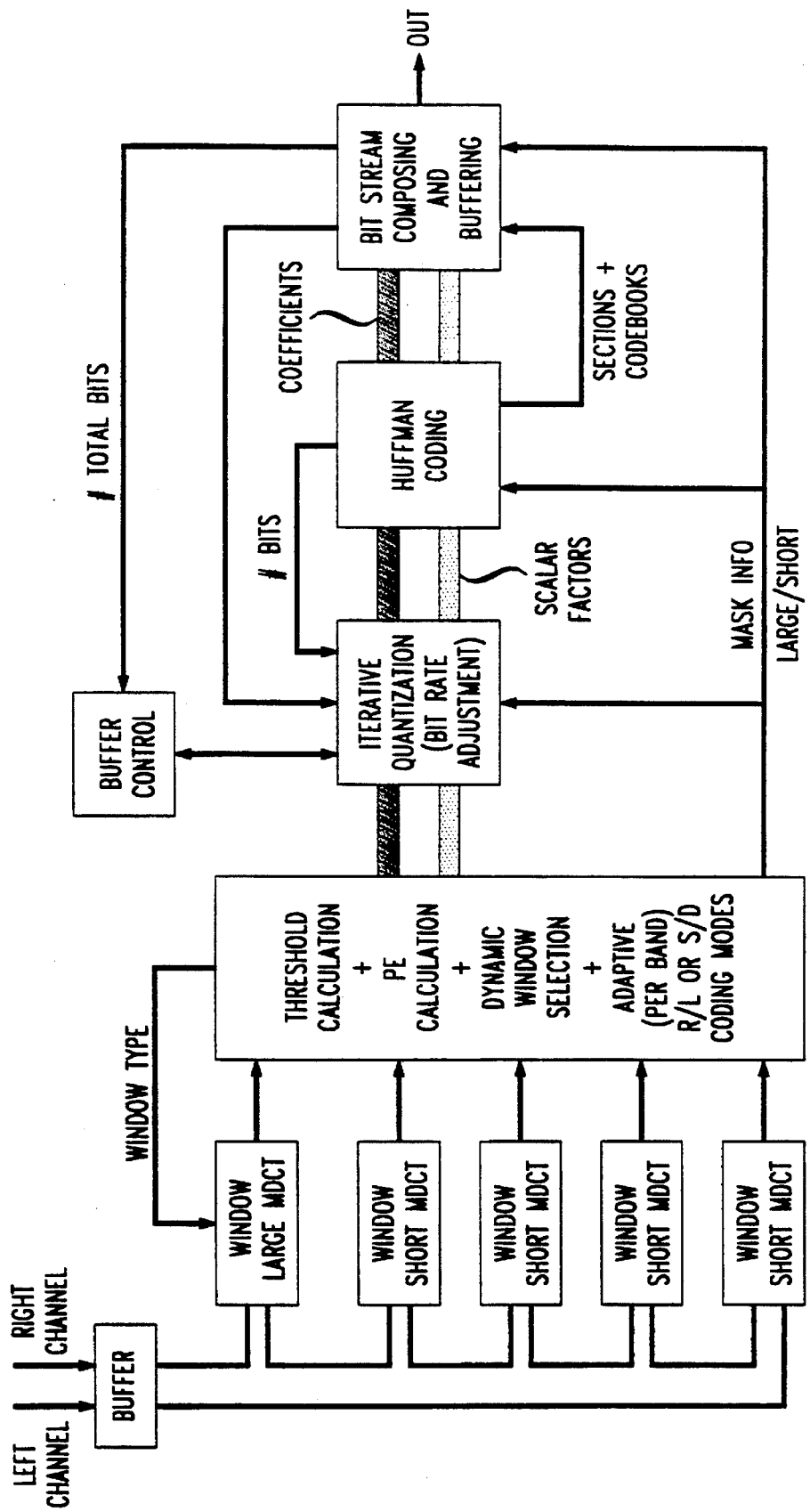
FIG. 7 is a block/flow diagram illustrating the overall processing of input signals to derive the output bitstream.

It has been observed that for short windows the information about stationarity lies more on its PE value than on the differential to the PE value of the precedent window. Accordingly, the tirst window that has a PE value larger than a predefined threshold is detected. PE2 is identified with location L1, PE3 with L2 and PE4 with location L3. In either case, a START window is placed before the current segment that will be coded with short windows. A STOP window is needed to complete the process. There are, however, two possibilities. If the identified location where the strong non-stationarity of the signal begins is L1 or L2 then, this is well inside the short window sequence, no coding artifacts result and the coding sequence is depicted in FIG. 5b. If the location if L4, then, in the worst situation, the non-stationarity may begin very close to the right edge of the last short window. Previous results have consistently shown that placing a STOP window—in coding conditions—in these circumstances degrades significantly the reconstruction of the signal in this switching point. For this reason, another set of four short windows is placed before a STOP window. The resulting coding sequence is represented in FIG. 5e.

If none of the short PEs is above the threshold, the remaining possibilities are L4 or L5. In this case, the problem lies ahead of the scope of the short window sequence and the first segment in the buffer may be immediately coded using a regular large window.

To identify the correct location, another short window must be processed. It is represented in FIG. 5a by a dotted curve and its PE value, $PE1_{n+1}$, is also computed. As it is easily recognized, this short window already belongs to the next segment. IF $PE1_{n-1}$ is above the threshold, then, the location is L4 and, as depicted in FIG. 5c, a START window may be followed by a STOP window. In this case the spread of the quantization noise will be limited to the length of a short window, and a better coding gain is achieved. In the rare situation of the location being L5, then the coding is done according to the sequence of FIG. 5d. The way to prove that in this case that is fight solution is by confirming that $PE2_{n+1}$ will be above the threshold. $PE2_{n+1}$ is the PE of the short window (not represented in FIG. 5) immediately following the window identified with $PE1_{n+1}$.

As mentioned before for each segment, RIGHT and LEFT channels use the same type of analysis/synthesis window. This means that a switch is done for both channels when at least one channel requires it.

It has been observed that for low bitrate applications the solution of FIG. 5c, although representing a good local psychoacoustic solution, demands an unreasonably large number of bits that may adversely affect the coding quality of subsequent segments. For this reason, that coding solution may eventually be inhibited.

It is also evident that the details of the reconstructed signal when short windows are used are closer to the original signal than when only regular large window are used. This is so because the attack is basically a wide bandwidth signal and may only be considered stationary for very short periods of time. Since short windows have a greater temporal resolution than large windows, they are able to follow and reproduce with more fidelity the varying pattern of the spectrum. In other words, this is the difference between a more precise local (in time) quantization of the signal and a global (in frequency) quantization of the signal.

The final masking threshold of the stereophonic coder is calculated using a combination of monophonic and stereophonic thresholds. While the monophonic threshold is computed independently for each channel, the stereophonic one considers both channels.

The independent masking threshold for the RIGHT or the LEFT channel is computed using a psychoacoustic model that includes an expression for tone masking noise and noise masking tone. The latter is used as a conservative approximation for a noise masking noise expression. The monophonic threshold is calculated using the same procedure as previous work. In particular, a tonality measure considers the evolution of the power and the phase of each frequency coefficient across the last three segments to identify the signal as being more tone-like or noise-like. Accordingly, each psychoacoustic expression is more or less weighted than the other. These expressions found in the literature were updated for better performance. They are defined as:

$$TMN_{dB} = 19.5 + bark \frac{18.0}{26.0}$$

$$NMT_{dB} = 6.56 - bark \frac{3.06}{26.0}$$

where bark is the frequency in Bark scale. This scale is related to what we may call the cochlear filters or critical bands which, in turn, are identified with constant length segments of the basilar membrane. The final threshold is adjusted to consider absolute thresholds of masking and also to consider a partial premasking protection.

A brief description of the complete monophonic threshold calculation follows. Some terminology must be introduced in order to simplify the description of the operations involved.

The spectrum of each segment is organized in three different ways, each one following a different purpose.

1. First, it may be organized in partitions. Each partition has associated one single Bark value. These partitions provide a resolution of approximately either one MDCT line or ⅓ of a critical band, whichever is wider. At low frequencies a single line of the MDCT will constitute a coder partition. At high frequencies, many lines will be combined into one coder partition. In this case the Bark value associated is the median Bark point of the partition. This partitioning of the spectrum is necessary to insure an acceptable resolution for the spreading function. As will be shown later, this function represents the masking influence among neighboring critical bands.

2. Secondly, the spectrum may be organized in bands. Bands are defined by a parameter file. Each band groups a number of spectral lines that are associated with a single scale factor that results from the final masking threshold vector.

3. Finally, the spectrum may also be organized in sections. It will be shown later that sections involve an integer number of bands and represent a region of the spectrum coded with the same Huffman code book.

Three indices for data values are used. These are:
- $\omega \rightarrow$ indicates that the calculation is indexed by frequency in the MDCT line domain.
- $b \rightarrow$ indicates that the calculation is indexed in the threshold calculation partition domain. In the case where we do a convolution or sum in that domain, bb will be used as the summation variable.
- $n \rightarrow$ indicates that the calculation is indexed in the coder band domain.

Additionally some symbols are also used:
1. The index of the calculation partition, b.
2. The lowest frequency line in the partition, $\omega low_b$.
3. The highest frequency line in the partition, $\omega high_b$.
4. The median bark value of the partition, $bval_b$.
5. The value for tone masking noise (in dB) for the partition, $TMN_b$.
6. The value for noise masking tone (in dB) for the partition, $NMT_b$.

Several points in the following description refer to the "spreading function". It is calculated by the following method:

$$tmpx = 1.05(j-i),$$

Where i is the bark value of the signal being spread, j the bark value of the band being spread into, and tmpx is a temporary variable.

$$x = 8 \, minimum((tmpx-0.5)^2 - 2(tmpx-0.5), 0)$$

Where x is a temporary variable, and minimum(a,b) is a function returning the more negative of a or b.

$$tmpy = 15.811389 + 7.5(tmpx+0.474) - 17.5(1.+(tmpx+0.474)^2)^{0.5}$$

where tmpy is another temporary variable.

if $(tmpy < -100)$ then $\{sprdngf(i,j) = 0\}$ else $\{sprdngf(i,j) = 10^{\frac{(x+tmpy)}{10.}}\}$.

Steps in Threshold Calculation

The following steps are the necessary steps for calculation the $SMR_n$ used in the coder.

1. Concatenate 512 new samples of the input signal to form another 1024 samples segment. Please refer to FIG. 5a.

2. Calculate the complex spectrum of the input signal using the O-FFT as described in 2.0 and using a sine window.

3. Calculate a predicted r and $\phi$

The polar representation of the transform is calculated, $r_\omega$ and $\phi_\omega$ represent the magnitude and phase components of a spectral line of the transformed segment.

A predicted magnitude, $\hat{r}_\omega$, and phase, $\hat{\phi}_\omega$, are calculated from the preceding two threshold calculation blocks' r and $\phi$:

$$\hat{r}_\omega = 2r_\omega(t-1) - r_{107}(t-2)$$

$$\hat{\phi}_\omega = 2\phi_\omega(t-1) - \phi_\omega(t-2)$$

where t represents the current block number, t−1 indexes the previous block's data, and t−2 indexes the data from the threshold calculation block before that.

b 4. Calculate the unpredictability measure $c_\omega$ $c_\omega$, the unpredictability measure, is:

$$c_\omega = \frac{((r_\omega\cos\phi_\omega - \hat{r}_\omega\cos\hat{\phi}_\omega)^2 + (r_\omega\sin\phi_\omega - \hat{r}_\omega\sin\hat{\phi}_\omega)^2)^{.5}}{r_\omega + abs(\hat{r}_\omega)}$$

5. Calculate the energy and unpredictability in the threshold calculation partitions.

The energy in each partition, $e_b$, is:

$$e_b = \sum_{\omega=\omega low_b}^{\omega high_b} r_\omega^2$$

and the weighted unpredictability, $c_b$, is:

$$c_b = \sum_{\omega=\omega low_4}^{\omega high_b} r_\omega^2 c_\omega$$

6. Convolve the partitioned energy and unpredictability with the spreading function.

$$ecb_b = \sum_{bb=1}^{bmax} e_{bb} sprdngf(bval_{bb}, bval_b)$$

$$ct_b = \sum_{bb=1}^{bmax} c_{bb} sprdngf(bval_{bb}, bval_b)$$

Because $ct_b$ is weighted by the signal energy, it must be renormalized to $cb_b$.

$$cb_b = \frac{ct_b}{ecb_b}$$

At the same time, due to the non-normalized nature of the spreading function, $ecb_b$ should be renormalized and the normalized energy $en_b$, calculated.

$$en_b = \frac{ecb_b}{rnorm_b}$$

The normalization coefficient, $rnorm_b$ is:

$$rnorm_b = \frac{1}{\sum_{bb=0}^{bmax} sprdngf(bval_{bb}, bval_b)}$$

7. Convert $cb_b$ to $tb_b$.

$$tb_b = -0.299 - 0.43 \log_e(cb_b)$$

Each $tb_b$ is limited to the range of $0 \leq tb_b \leq 1$.

8. Calculate the required SNR in each partition.

$$TMN_b = 19.5 + bval_b \frac{18.0}{26.0}$$

$$NMT_b = 6.56 - bval_b \frac{3.06}{26.0}$$

Where $TMN_b$ is the tone masking noise in dB and $NMT_b$ is the noise masking tone value in dB.
The required signal to noise ratio, $SNR_b$, is:

$$SNR_b = tb_b TMN_b + (1 - tb_b) NMT_b$$

9. Calculate the power ratio.
The power ratio, $bc_b$, is:

$$bc_b = 10^{\frac{-SNR_b}{10}}$$

10. Calculation of actual energy threshold, $nb_b$.

$$nb_b = en_b bc_b$$

11. Spread the threshold energy over MDCT lines, yielding $nb_\omega$ $$nb_\omega = \frac{nb_b}{\omega high_b - \omega low_b + 1}$$

12. Include absolute thresholds, yielding the final energy threshold of audibility, $thr_\omega$ $$thr_\omega = max(nb_{107}, absthr_\omega).$$

The dB values of absthr shown in the "Absolute Threshold Tables" are relative to the level that a sine wave of ±½ lsb has in the MDCT used for threshold calculation. The dB values must be convened into the energy domain after considering the MDCT normalization actually used.

13. Pre-echo control
14. Calculate the signal to mask ratios, $SMR_n$.
The table of "Bands of the Coder" shows
  1. The index, n, of the band.
  2. The upper index, $\omega high_n$ of the band n. The lower index, $\omega low_n$, is computed from the previous band as $\omega high_{n-1} + 1$.

To further classify each band, another variable is created. The width index, $width_n$, will assume a value $width_n = 1$ if n is a perceptually narrow band, and $width_n = 0$ if n is a perceptually wide band. The former case occurs if $$bval_{\omega high_b} - bval_{\omega low_b} < bandlength$$

bandlength is a parameter set in the initialization murine. Otherwise the latter case is assumed.

Then, if ($width_n = 1$), the noise level in the coder band, $nband_n$ is calculated as:

$$nband_n = \frac{\sum_{\omega = \omega low_n}^{\omega high_n} thr_\omega}{\omega high_n - \omega low_n + 1},$$

else, $$nband_n = minimum(thr_{\omega low_n}, \ldots, thr_{\omega high_n})$$

Where, in this case, minimum(a, ..., z) is a function returning the most negative or smallest positive argument of the arguments a ... z.
The ratios to be sent to the decoder, $SMR_n$, are calculated as:

$$SMR_n = 10 \times \log_{10} \left( \frac{[12.0 * nband_n]^{0.5}}{minimum(absthr)} \right)$$

It is important to emphasize that since the tonality measure is the output of a spectrum analysis process, the analysis window has a sine form for all the cases of large or short segments. In particular, when a segment is chosen to be coded as a START or STOP window, its tonality information is obtained considering a sine window; the remaining operations, e.g. the threshold calculation and the quantization of the coefficients, consider the spectrum obtained with the appropriate window.

STEREOPHONIC THRESHOLD

The stereophonic threshold has several goals. It is known that most of the time the two channels sound "alike". Thus, some correlation exists that may be converted in coding gain. Looking into the temporal representation of the two channels, this correlation is not obvious. However, the spectral representation has a number of interesting features that may advantageously be exploited. In fact, a very practical and useful possibility is to create a new basis to represent the two channels. This basis involves two orthogonal vectors, the vector SUM and the vector DIFFERENCE defined by the following linear combination:

$$\begin{bmatrix} SUM \\ DIF \end{bmatrix} = \frac{1}{2} \begin{bmatrix} 1 & 1 \\ 1 & -1 \end{bmatrix} \times \begin{bmatrix} RIGHT \\ LEFT \end{bmatrix}$$

These vectors, which have the length of the window being used, are generated in the frequency domain since the transform process is by definition a linear operation. This has the advantage of simplifying the computational load.

The first goal is to have a more decorrelated representation of the two signals. The concentration of most of the energy in one of these new channels is a consequence of the redundancy that exists between RIGHT and LEFT channels and on average, leads always to a coding gain.

A second goal is to correlate the quantization noise of the RIGHT and LEFT channels and control the localization of the noise or the unmasking effect This problem arises if RIGHT and LEFT channels are quantized and coded independently. This concept is exemplified by the following context: supposing that the threshold of masking for a particular signal has been calculated, two situations may be created. First we add to the signal an amount of noise that corresponds to the threshold. If we present this same signal with this same noise to the two ears then the noise is masked. However, if we add an amount of noise that corresponds to the threshold to the signal and present this combination to one ear, do the same operation for the other ear but with noise uncorrelated with the previous one, then the noise is not masked. In order to achieve masking again, the noise at both ears must be reduced by a level given by the masking level differences (MLD).

The unmasking problem may be generalized to the following form: the quantization noise is not masked if it does not follow the localization of the masking signal. Hence, in particular, we may have two limit cases: center localization of the signal with unmasking more noticeable on the sides of the listener and side localization of the signal with unmasking more noticeable on the center line.

The new vectors SUM and DIFFERENCE are very convenient because they express the signal localized on the center and also on both sides of the listener. Also, they enable to control the quantization noise with center and side image. Thus, the unmasking problem is solved by controlling the protection level for the MLD through these vectors. Based on some psychoacoustic information and other experiments and results, the MLD protection is particularly critical for very low frequencies to about 3 KHz. It appears to depend only on the signal power and not on its tonality properties. The following expression for the MLD proved to give good results:

$$MLD_{dB}(i) = 25.5 \left[ \cos \frac{\pi b(i)}{32.0} \right]^2$$

where i is the partition index of the spectrum (see [7]), and b(i) is the bark frequency of the center of the partition i. This expression is only valid for $b(i) \leq 16.0$ i.e. for frequencies below 3 KHz. The expression for the MLD threshold is given by:

$$THR_{MLD}(i) = C(i) 10^{-\frac{MLD_{dB}(i)}{10}}$$

C(i) is the spread signal energy on the basilar membrane, corresponding only to the partition i.

A third and last goal is to take advantage of a particular stereophonic signal image to extract irrelevance from directions of the signal that are masked by that image. In principle, this is done only when the stereo image is strongly defined in one direction, in order to not compromise the richness of the stereo signal. Based on the vectors SUM and DIFFERENCE, this goal is implemented by postulating the following two dual principles:

1. If there is a strong depression of the signal (and hence of the noise) on both sides of the listener, then an increase of the noise on the middle line (center image) is perceptually tolerated. The upper bound is the side noise.
2. If there is a strong localization of the signal (and hence of the noise) on the middle line, then an increase of the (correlated) noise on both sides is perceptually tolerated. The upper bound is the center noise.

However, any increase of the noise level must be connected by the MLD threshold.

According to these goals, the final stereophonic threshold is computed as follows. First, the thresholds for channels SUM and DIFFERENCE are calculated using the monophonic models for noise- masking-tone and tone-masking-noise. The procedure is exactly the one presented in 3.2 till step 10. At this point we have the actual energy threshold per band, $nb_b$ for both channels. By convenience, we call them $THRn_{SUM}$ and $THRn_{DIF}$, respectively for the channel SUM and the channel DIFFERENCE.

Secondly, the MLD threshold for both channels i.e. $THRn_{MLD,SUM}$ and $THRn_{MLD,DIF}$, are also calculated by:

$$THRn_{MLD,SUM} = en_{b,SUM} 10^{-\frac{MLDn_{dB}}{10}}$$

$$THRn_{MLD,DIF} = en_{b,DIF} 10^{-\frac{MLDn_{dB}}{10}}$$

The MLD protection and the stereo irrelevance are considered by computing:

$$nthr_{SUM} = MAX[THRn_{SUM}, MIN(THRn_{DIF}, THRn_{MLD,DIF})]$$

$$nthr_{DIF} = MAX[THRn_{DIF}, MIN(THRn_{SUM}, THRn_{MLD,SUM})]$$

After these operations, the remaining steps after the 11th, as presented in 3.2 are also taken for both channels. In essence, these last thresholds are further adjusted to consider the absolute threshold and also a partial premasking protection. It must be noticed that this premasking protection was simply adopted from the monophonic case. It considers a monaural time resolution of about 2 milliseconds. However, the binaural time resolution is as accurate as 6 microseconds! To conveniently code stereo signals with relevant stereo image based on interchannel time differences, is a subject that needs further investigation.

STEREOPHONIC CODER

Figure 12:
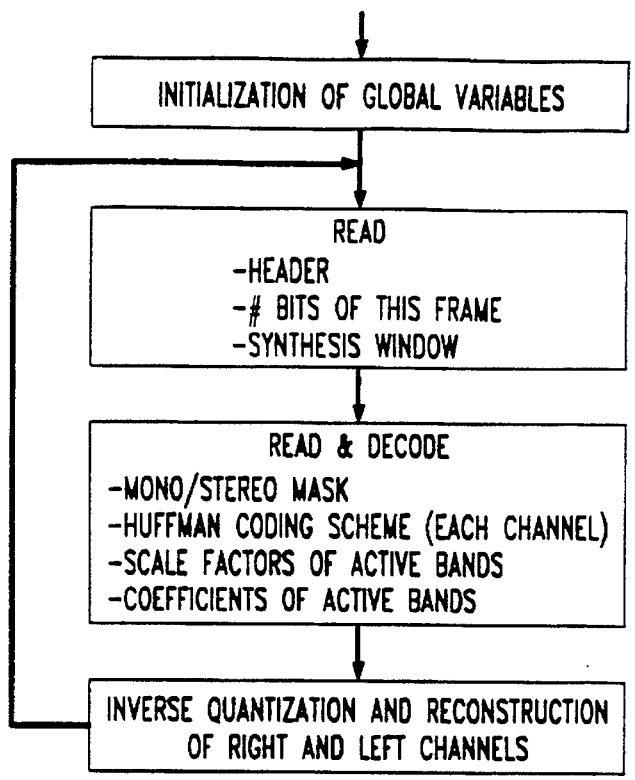
FIG. 12 shows operations at a decoder that are complementary to those for an encoder.

The simplified structure of the stereophonic coder is presented in FIG. 12. For each segment of data being analysed, detailed information about the independent and relative behavior of both signal channels may be available through the information given by large and short transforms. This information is used according to the necessary number of steps needed to code a particular segment. These steps involve essentially the selection of the analysis window, the definition on a band basis of the coding mode (R/L or S/D), the quantization and Huffman coding of the coefficients and scale factors and finally, the bitstream composing Coding Mode Selection When a new segment is read, the tonality updating for large and short analysis windows is done. Monophonic thresholds and the PE values are calculated according to the technique described in Section 3.1. This gives the first decision about the type of window to be used for both channels.

Once the window sequence is chosen, an orthogonal coding decision is then considered. It involves the choice between independent coding of the channels, mode RIGHT/LEFT (R/L) or joint coding using the SUM and DIFFERENCE channels (S/D). This decision is taken on a band basis of the coder. This is based on the assumption that the binaural perception is a function of the output of the same critical bands at the two ears. If the threshold at the two channels is very different, then there is no need for MLD protection and the signals will not be more decorrelated if the channels SUM and DIFFERENCE are considered. If the signals are such that they generate a stereo image, then a MLD protection must be activated and additional gains may be exploited by choosing the S/D coding mode. A convenient way to detect this latter situation is by comparing the monophonic threshold between RIGHT and LEFT channels. If the thresholds in a particular band do not differ by more than a predefined value, e.g. 2 dB, then the S/D coding mode is chosen. Otherwise the independent mode R/L is assumed. Associated which each band is a one bit flag that specifies the coding mode of that band and that must be transmitted to the decoder as side information. >From now on it is called a coding mode flag.

Figure 13:
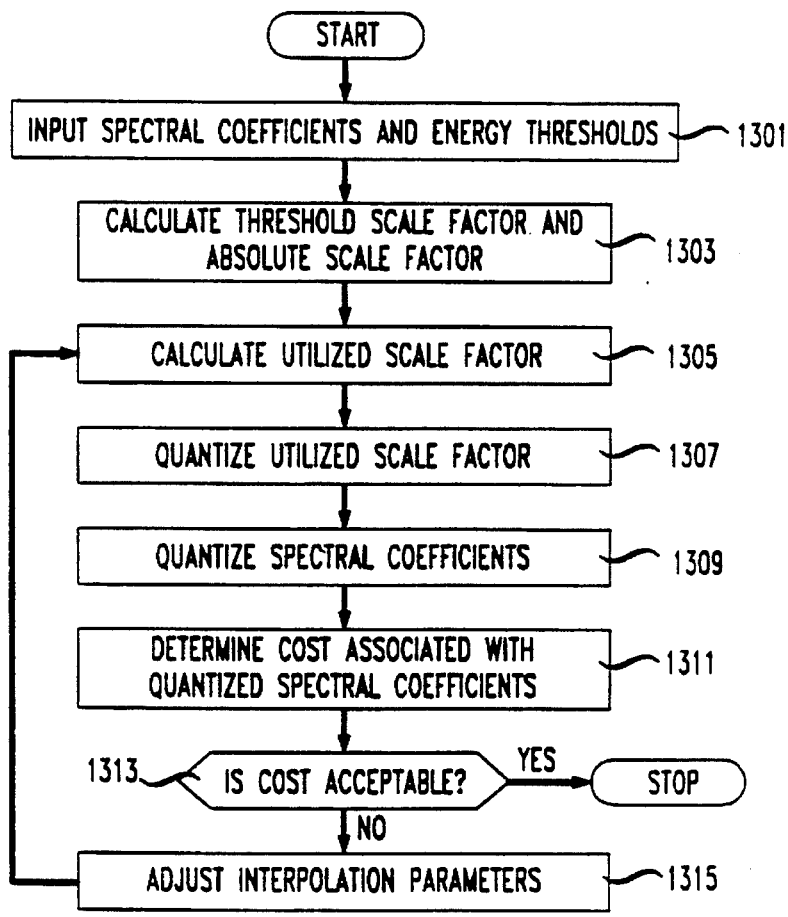
FIG. 13 is a flowchart illustrating certain quantization operations in accordance with an aspect of the present invention.
Figure 14:
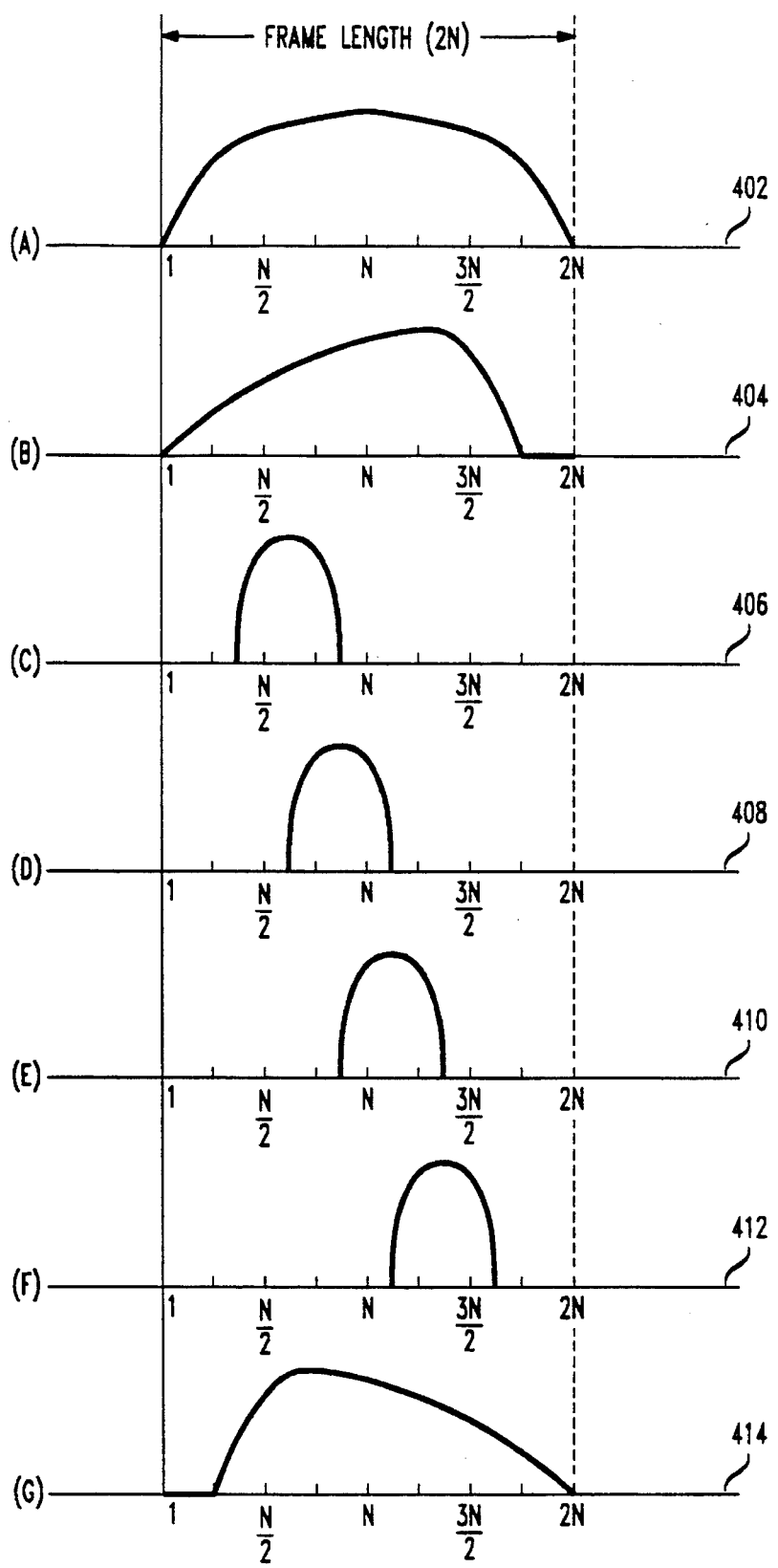
FIG. 14(a) through 14(g) are illustrative windows for use with the filter bank of FIG. 4.

The coding mode decision is adaptive in time since for the same band it may differ for subsequent segments, and is also adaptive in frequency since for the same segment, the coding mode for subsequent bands may be different. An illustration of a coding decision is given in FIG. 13. This illustration is valid for long and also short segments.

At this point it is clear that since the window switching mechanism involves only monophonic measures, the maximum number of PE measures per segment is b 10(2 channels *[1 large window+4 short windows]). However, the maximum number of thresholds that we may need to compute per segment is 20 and therefore 20 tonality measures must be always updated per segment (4 channels*[1 large window+4 short windows]).

Bitrate Adjustment

It was previously said that the decisions for window switching and for coding mode selection are orthogonal in the sense that they do not depend on each other. Independent to these decisions is also the final step of the coding process that involves quantization, Huffman coding and bitstream composing; i.e. there is no feedback path. This fact has the advantage of reducing the whole coding delay to a minimum value (1024/48000=21.3 milliseconds) and also to avoid instabilities due to unorthodox coding situations.

The quantization process affects both spectral coefficients and scale factors. Spectral coefficients are clustered in bands, each band having the same step size or scale factor. Each step size is directly computed from the masking threshold corresponding to its band, as seen in 3.2, step 14. The quantized values, which are integer numbers, are then converted to variable word length or Huffman codes. The total number of bits to code the segment, considering additional fields of the bitstream, is computed. Since the bitrate must be kept constant, the quantization process must be iteratively done till that number of bits is within predefined limits. After the number of bits needed to code the whole segment, considering the basic masking threshold, the degree of adjustment is dictated by a buffer control unit. This control unit shares the deficit or credit of additional bits among several segments, according to the needs of each one.

Figure 9:
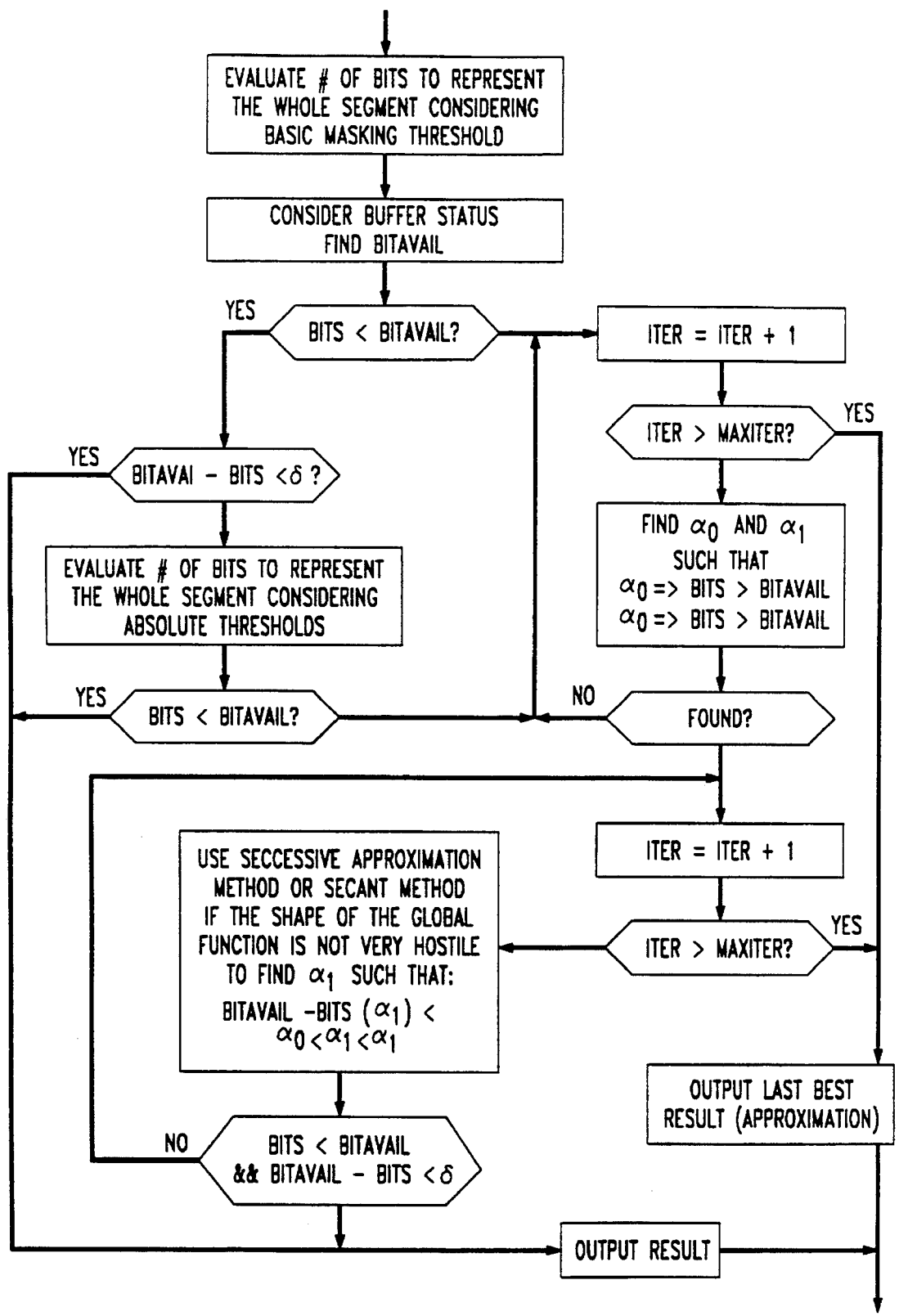
FIG. 9 is a flowchart representation of certain bit allocation functionality.
Figure 11A:
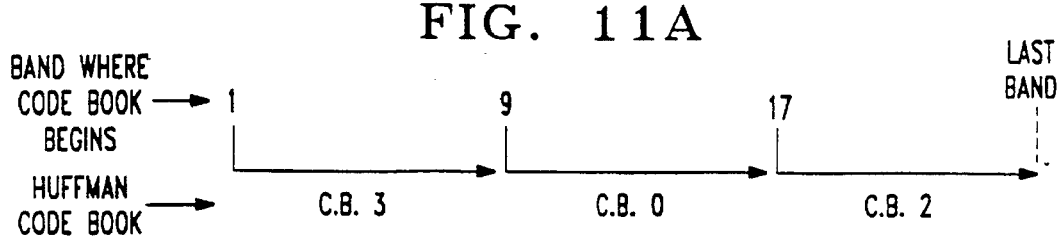
FIGS. 11a through 11c illustrate certain Huffman coding operations.
Figure 11B:
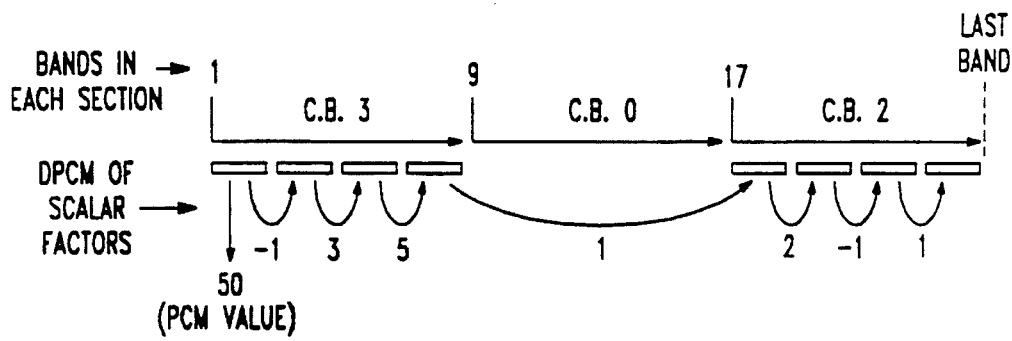
Figure 11C:
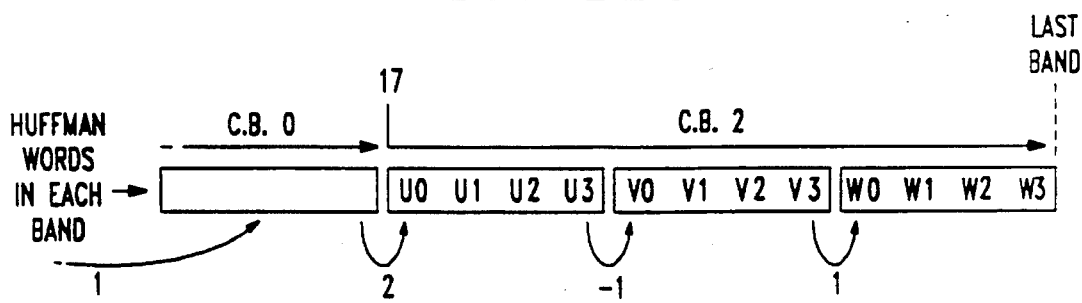

The technique of the bitrate adjustment murine is represented by the flowchart of FIG. 9. It may be seen that after the total number of available bits to be used by the current segment is computed, an iterative procedure tries to find a factor $\alpha$ such that if all the initial thresholds are multiplied by this factor, the final total number of bits is smaller then and within an error $\delta$ of the available number of bits. Even if the approximation curve is so hostile that $\alpha$ is not found within the maximum number of iterations, one acceptable solution is always available.

The main steps of this routine are as follows. First, an interval including the solution is found. Then, a loop seeks to rapidly converge to the solution. At each iteration, the best solution is updated.

In order to use the same procedure for segments coded with large and short windows, in this latter case, the coefficients of the 4 short windows are clustered by concatenating homologue bands. Scale factors are clustered in the same.

The bitrate adjustment routine calls another murine that computes the total number of bits to represent all the Huffman coded words (coefficients and scale factors). This latter routine does a spectrum partioning according to the amplitude distribution of the coefficients. The goal is to assign predefined Huffman code books to sections of the spectrum. Each section groups a variable number of bands and its coefficients are Huffman coded with a convenient book. The limits of the section and the reference of the code book must be sent to the decoder as side information.

The spectrum partioning is done using a minimum cost strategy. The main steps are as follows. First, all possible sections are defined—the limit is one section per band—each one having the code book that best matches the amplitude distribution of the coefficients within that section. As the beginning and the end of the whole spectrum is known, if K is the number of sections, there are K-1 separators between sections. The price to eliminate each separator is computed. The separator that has a lower price is eliminated (initial prices may be negative). Prices are computed again before the next iteration. This process is repeated till a maximum allowable number of sections is obtained and the smallest price to eliminate another separator is higher than a predefined value.

Aspects of the processing accomplished by quantizer/rate-loop 206 in FIG. 2 will now be presented. In the prior art, rate-loop mechanisms have contained assumptions related to the monophonic case. With the shift from monophonic to stereophonic perceptual coders, the demands placed upon the rate-loop are increased.

The inputs to quantizer/rate-loop 206 in FIG. 2 comprise special coefficients (i.e., the MDCT coefficients) derived by analysis filter bank 202, and outputs of perceptual model 204, including calculated thresholds corresponding to the spectral coefficients.

Quantizer/rate-loop 206 quantizes the spectral information based, in part, on the calculated thresholds and the absolute thresholds of hearing and in doing so provides a bitstream to entropy coder 208. The bitstream includes signals divided into three parts: (1) a first part containing the standardized side information; (2) a second part containing the scaling factors for the 35 or 56 bands and additional side information used for so-called adaptive-window switching, when used (the length of this part can vary depending on information in the first part) and (3) a third part comprising the quantized spectral coefficients.

A "utilized scale factor", $\Delta$, is iteratively derived by interpolating between a calculated scale factor and a scale factor derived from the absolute threshold of hearing at the frequency corresponding to the frequency of the respective spectral coefficient to be quantized until the quantized spectral coefficients can be encoded within permissible limits.

An illustrative embodiment of the present invention can be seen in FIG. W. As shown at W01 quantizer/rate-loop receives a spectral coefficient, $C_p$ and an energy threshold, E, corresponding to that spectral coefficient. A "threshold scale factor", $\Delta_0$ is calculated by $$\Delta_0 = \sqrt{12E}$$

An "absolute scale factor", $\Delta_A$, is also calculated based upon the absolute threshold of hearing (i.e., the quietest sound that can be heard at the frequency corresponding to the scale factor). Advantageously, an interpolation constant, $\alpha$, and interpolation bounds $\alpha_{high}$ and $\alpha_{low}$ are initialized to aid in the adjustment of the utilized scale factor.

$$\alpha_{high}=1$$

$$\alpha_{low}=0$$

$$\alpha=\alpha_{high}$$

Next, as shown in W05, the utilized scale factor is determined from:

$$\Delta=\Delta_0{}^\alpha \times \Delta_A{}^{(1-alpha)}$$

Next, as shown in W07, the utilized scale factor is itself quantized because the utilized scale factor as computed above is not discrete but is advantageously discrete when transmitted and used.

$$\Delta=Q^{-1}(Q(\Delta))$$

Next, as shown in W09, the spectral coefficient is quantized using the utilized scale factor to create a "quantized spectral coefficient" $Q(C_f,\Delta)$.

$$Q(C_f,\Delta)=NINT(C_f/\Delta)$$

where "NINT" is the nearest integer function. Because quantizer/rate loop 206 must transmit both the quantized spectral coefficient and the utilized scale factor, a cost, C, is calculated which is associated with how many bits it will take to transmit them both. As shown in FIG. W11, $$C=FOO(Q(C_f,\Delta),Q(\Delta))$$

where FOO is a function which, depending on the specific embodiment, can be easily determined by persons having ordinary skill in the art of data communications. As shown in W13, the cost, C is tested to determine whether it is in a permissible range PR. When the cost is within the permissible range, $Q(C_f,\Delta)$ and $Q(\Delta)$ are transmitted to entropy coder 208.

Advantageously, and depending on the relationship of the cost C to the permissible range PR the interpolation constant and bounds are adjusted until the utilized scale factor yields a quantized spectral coefficient which has a cost within the permissible range. Illustratively, as shown in FIG. W at W13, the interpolation bounds are manipulated to produce a binary search. Specifically, when C>PR, $\alpha_{high}=\alpha$, alternately, when C<PR, $\alpha_{low}=\alpha$.

In either case, the interpolation constant is calculated by:

$$\alpha=\frac{\alpha_{low}+\alpha_{high}}{2}$$

The process then continues at W05 item lively until the C comes within the permissible range PR.

STEREOPHONIC DECODER

The stereophonic decoder has a very simple structure. Its main functions are reading the incoming bitstream, decoding all the data, inverse quantization and reconstruction of RIGHT and LEFF channels. The technique is represented in FIG. 12.

Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

I claim:

1. A method for coding an input set of stereophonic audio signals comprising a left channel signal and a right channel signal, the method comprising:
    (a) filtering the right channel signal and the left channel signal to obtain a first set of signals and a second set of signals, the first set of signals representing the frequency content of the right channel and the second set of signals representing the frequency content of the left channel;
    (b) generating a third set of signals representing the frequency content of a sum of the right channel signal and the left channel signal;
    (c) generating a fourth set of signals representing the frequency content of a difference between the right channel signal and the left channel signal;
    (d) based on the first set of signals, generating a first perceptual threshold for the first set of signals;
    (e) based on the second set of signals, generating a second perceptual threshold for the second set of signals;
    (f) based on the third set of signals, the fourth set of signals, the first perceptual threshold, and the second perceptual threshold, generating a third perceptual threshold for the third set of signals;
    (g) based on the third set of signals, the fourth set of signals, the first perceptual threshold, and the second perceptual threshold, generating a fourth perceptual threshold for the fourth set of signals; and
    (h) generating a signal based upon either:
        (i) the first set of signals, the second set of signals, and their respective perceptual thresholds; or
        (ii) the third set of signals, the fourth set of signals, and their respective perceptual thresholds.

2. The method of claim 1 wherein the third perceptual threshold and the fourth perceptual threshold each comprise a set of frequency bins, each frequency bin represented by a threshold value, and wherein the steps of generating the third perceptual threshold and the fourth perceptual threshold further comprise:
    (a) determining a smallest threshold value from a third perceptual threshold value and a corresponding fourth perceptual threshold value;
    (b) determining an amount by which the smallest threshold value can be raised while preventing a binaural unmasking condition;
    (c) raising the smallest threshold value by no more than the amount.

3. A method for coding a stereophonic audio signal comprising:
    (a) forming a left channel set of signals and a right channel set of signals;
    (b) forming a sum set of signals and a difference set of signals representative of a sum of the left channel set of signals and the right channel set of signals and a difference between the left channel set of signals and the right channel set of signals, respectively;
    (c) generating a left perceptual threshold, a right perceptual threshold, a sum perceptual threshold, and a difference perceptual threshold based on at least the left channel set of signals and the right channel set of signals; and (d) for at least one frequency bin value corresponding to a left frequency signal and a set of frequency bin values corresponding to a right frequency signal, a sum frequency signal, and a difference frequency signal, determining, based upon the at least one frequency bin value, the set of frequency bin values, a left threshold value, a right threshold value, a sum threshold value, and a difference threshold value, whether to code a portion of the stereophonic audio signal with a left frequency bin value and a right frequency bin value or a sum frequency bin value and a difference frequency bin value, the at least one frequency bin and the set of corresponding frequency bins being associated with a portion of the stereophonic audio signal.

4. A method for coding an audio signal comprising:

(a) identifying a block of the audio signal;

(b) determining a measure of perceptual entropy for at least a portion of the block;

(c) determining a differential perceptual entropy measure between the measure of perceptual entropy and a previous measure of perceptual entropy; and (d) determining, based upon the differential perceptual entropy measure, if the block represents a stationary signal or non-stationary signal.

5. The method of claim 4 further comprising repeating steps (a) through (d) for a second audio signal representing a second channel.

6. The method of claim 5 further comprising the step of coding the audio signal and the second audio signal with a set of small blocks if either the block of the audio signal or the block of the second audio signal is determined to represent a non-stationarity signal.

7. A device for decoding an encoded stereophonic audio signal having been encoded by:

(a) filtering a right channel signal and a left channel signal to obtain a first set of signals and a second set of signals, the first set of signals representing the frequency content of the right channel and the second set of signals representing the frequency content of the left channel;

(b) generating a third set of signals representing the frequency content of a sum of the right channel signal and the left channel signal;

(c) generating a fourth set of signals representing the frequency content of a difference between the right channel signal and the left channel signal;

(d) based on the first set of signals, generating a first perceptual threshold for the first set of signals;

(e) based on the second set of signals, generating a second perceptual threshold for the second set of signals;

(f) based on the third set of signals, the fourth set of signals, the first perceptual threshold, and the second perceptual threshold, generating a third perceptual threshold for the third set of signals;

(g) based on the third set of signals, the fourth set of signals, the first perceptual threshold, and the second perceptual threshold, generating a fourth perceptual threshold for the fourth set of signals; and (h) generating the encoded stereophonic audio signal based upon either
  (i) the first set of signals, the second set of signals, and their respective perceptual thresholds; or
  (ii) the third set of signals, the fourth set of signals, and their respective perceptual thresholds the device comprising:

(a) means for receiving the encoded audio stereophonic signal;

(b) means for identifying a first set of portions of the encoded stereophonic audio signal coded with the first perceptual threshold and the second perceptual threshold;

(c) means for identifying a second set of portions of the encoded stereophonic audio signal coded with the third perceptual threshold and the fourth perceptual threshold; and (d) means for decoding the first set of portions and the second set of portions to generate a decoded left channel set of signals and a decoded right channel set of signals.

* * * * *